Oct. 14, 1930.    M. C. HORINE    1,778,028

DOUBLE THREE-POINT SUSPENSION FOR MOTOR VEHICLE UNITS

Filed April 23, 1929

Inventor:
Merrill C. Horine
By his Attorneys
Redding, Greeley, O'Shea + Campbell Patented Oct. 14, 1930

1,778,028

UNITED STATES PATENT OFFICE

MERRILL C. HORINE, OF GRASMERE, NEW YORK, ASSIGNOR TO INTERNATIONAL MOTOR COMPANY, OF NEW YORK, N. Y., A CORPORATION OF DELAWARE

DOUBLE THREE-POINT SUSPENSION FOR MOTOR VEHICLE UNITS

Application filed April 23, 1929. Serial No. 357,390.

The present invention relates to unit mounting, particularly those upon a vehicle chassis, and embodies, more specifically, an improved mounting for a plurality of units, such mounting providing a three-point suspension for each unit, at the same time reducing the number of connections required between the chassis and the respective units. The conventional three-point suspension for engine, transmission and other units upon a vehicle is well known and the advantages thereof will be readily understood.

The three-point suspension principal is commonly used for both the so-called unit power plant design, wherein the transmission is more or less rigidly united with the engine and clutch housing, the whole power plant thus formed being supported on three points, and the so-called amidships or independent transmission mounting, wherein the engine and transmission are each independently mounted on three supporting points from the chassis frame, being connected by an intermediate drive shaft.

In motor vehicles of the heavy duty type, the units are often of such bulk and weight that in the conventional unit power plant design, the overhanging weight and torque reactions of the transmission occasion distortion and vibrations of destructive nature, whereas the independent suspension of the units requires more space than is conveniently available in practical commercial types of vehicles. This invention therefore combines in a large measure, the compactness of the unit power plant, with the adequate transmission support of the separately mounted transmission. Another advantage secured is that a three-point suspension for each unit is supplied with but five points of attachment to the frame.

More specifically, the invention includes the mounting of one unit directly upon another, the second unit being mounted upon the chassis at three points and the first unit being mounted at two additional points upon the chassis.

Further objects, not specifically enumerated above, will be apparent as the invention is described in greater detail in connection with the accompanying drawings, wherein.

Referring to the above drawings, the frame of a vehicle is shown at $a$, an internal combustion engine $b$ being mounted thereon at three points $b'$.

A transmission $c$ is mounted upon the frame $a$ at its rear end in bearings $c'$ and a third suspension point $c^2$ is provided, this suspension point being carried by the rear end of the engine and clutch housing.

Figure 1:
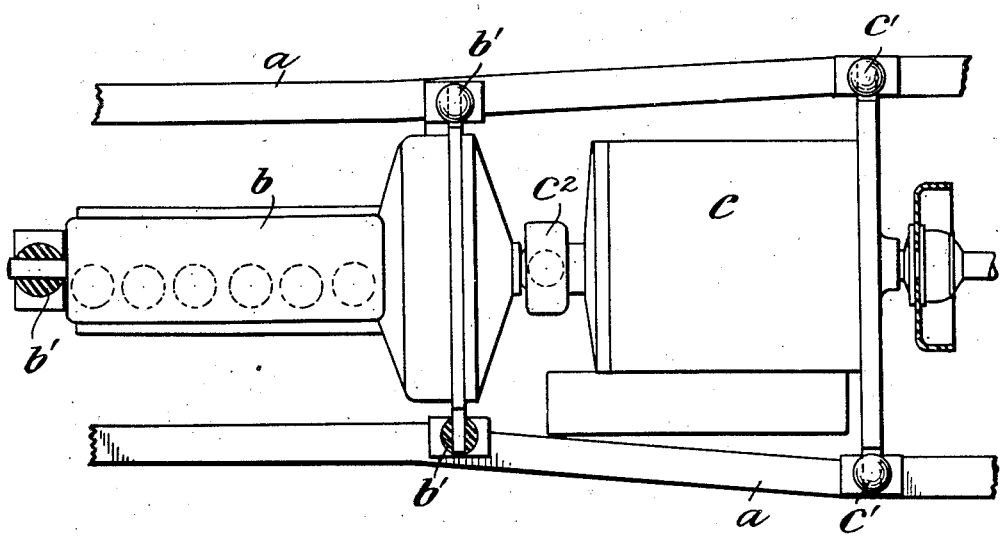
Figure 1 is a plan view showing the engine and transmission of a vehicle of the mechanical drive type, the units being mounted at five points upon the chassis, each of the two units being carried by a three-point suspension.
Figure 2:
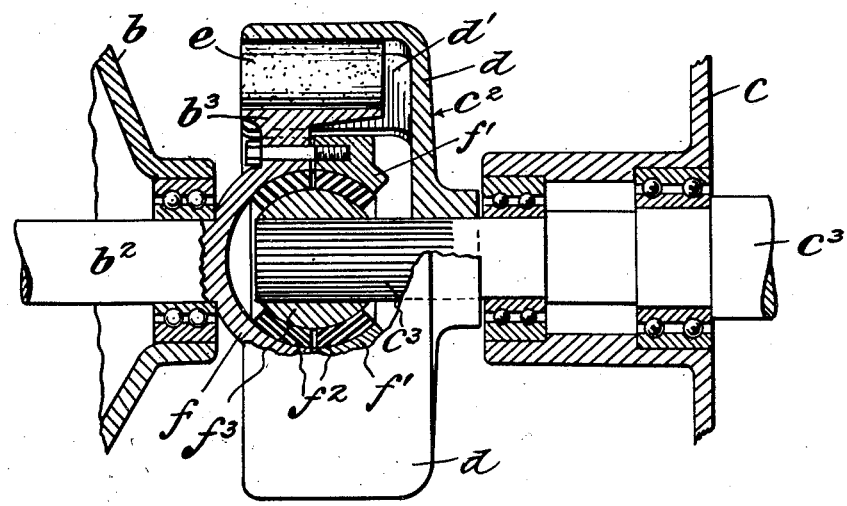
Figure 2 is an enlarged view in section, taken through the forward mounting of the transmission, the mounting being directly between the transmission and engine.

Figure 2 shows a proposed form of connection between the engine and transmission, such connection embodying a universal joint which connects the clutch shaft and transmission shaft yieldingly. Such connection embodies, more specifically, a housing $d$ carried by the transmission shaft $c^3$. Inwardly extending webs $d'$ cooperate with radially extending webs $b^3$ formed on the clutch shaft $b^2$. Blocks $e$ of suitable cushioning material are carried between the webs $b^3$ and $d'$, thus cushioning the forces transmitted between the shafts $b^2$ and $c^3$.

Proper alignment of the shafts is secured by means of a ball and socket joint including a two part socket $f$ formed within the radially extending webs $b^3$ and a cooperating socket plate $f'$. A bushing $f^2$ is mounted within the socket and serves as a bearing for a ball $f^3$ carried by the end of the transmission shaft $c^3$.

From the above description, it will be seen that three independent supports for each unit are provided, the two units being mounted upon the chassis at five points. The usual transverse supporting arm required at the forward end of the transmission is eliminated by the above construction and the resulting structure accordingly simplified. Although the invention has been described with reference to the specific construction shown in the accompanying drawings, it is not to be limited, save as defined in the appended claims.

I claim as my invention:

1. In a mounting for a plurality of units upon a vehicle frame, means for mounting one of the units upon the frame at three points, means for mounting a second unit upon the frame at two points, aligned rotatable shafts carried in the units, a torque cushioning device connecting the shafts between the units and a universal joint in the torque cushioning device, the second unit being supported at a third point on the shafts.

2. In a mounting for a plurality of units upon a vehicle frame, means for mounting one of the units upon the frame at three points, means for mounting a second unit upon the frame at two points, aligned rotatable shafts carried in the units, and a universal joint connecting the shafts between the units, the second unit being supported at a third point on the shafts.

3. In a mounting for a unitary engine and clutch housing and a transmission housing upon a vehicle frame, means for mounting the forward end of the engine upon the frame at a single point, means to mount the clutch housing upon the frame at two points, means for mounting the rear of the transmission housing upon the frame at two points, and means to mount the front of the transmission housing upon the clutch housing, said last named means including a torque cushioning device.

4. In a mounting for a plurality of units upon a vehicle frame, means for mounting one of the units upon the frame at three points, means for mounting a second unit upon the frame at two points, and means for mounting the second unit at a third point upon the first unit with provision for relative movement with respect thereto.

This specification signed this 20th day of April A. D. 1929.

MERRILL C. HORINE.